(12) United States Patent
Chou et al.

(10) Patent No.: US 9,008,623 B2
(45) Date of Patent: Apr. 14, 2015

(54) DYNAMIC DEVICE NAMING AND CONNECTION IN WIRELESS COMMUNICATION SYSTEM AND METHOD THEREOF

(71) Applicant: National Taiwan University, Taipei (TW)

(72) Inventors: Chun-Ting Chou, Taipei (TW); Ya-hui Chen, Taipei (TW)

(73) Assignee: National Taiwan University, Taipei (TW)

( * ) Notice: Subject to any disclaimer, the term of this patent is extended or adjusted under 35 U.S.C. 154(b) by 19 days.

(21) Appl. No.: 13/861,827

(22) Filed: Apr. 12, 2013

(65) Prior Publication Data
US 2013/0273888 A1   Oct. 17, 2013

(30) Foreign Application Priority Data
Apr. 12, 2012   (TW) .............................. 101113056 A

(51) Int. Cl.
*H04W 76/02* (2009.01)
*H04W 8/00* (2009.01)
*H04W 12/06* (2009.01)
*H04W 84/18* (2009.01)

(52) U.S. Cl.
CPC ............ *H04W 76/021* (2013.01); *H04W 8/005* (2013.01); *H04W 12/06* (2013.01); *H04W 84/18* (2013.01)

(58) Field of Classification Search
USPC .................... 455/410, 411, 412.1, 414.1, 418
See application file for complete search history.

(56) References Cited

U.S. PATENT DOCUMENTS

| | | | |
|---|---|---|---|
| 2006/0276133 A1 | 12/2006 | Ly et al. | |
| 2009/0017799 A1 | 1/2009 | Thorn | |
| 2009/0259719 A1* | 10/2009 | Kindberg et al. | ............. 709/204 |
| 2011/0022661 A1 | 1/2011 | Alsina | |

OTHER PUBLICATIONS

Office Action Dated Dec. 12, 2014 in corresponding Taiwan Patent Application No. 101113056.

* cited by examiner

*Primary Examiner* — Sam Bhattacharya
(74) *Attorney, Agent, or Firm* — Donald E. Stout; Stout, Uxa & Buyan, LLP

(57) ABSTRACT

A dynamic device naming and connection in a wireless communication method includes the following steps: firstly, a first device changes a first name of the first device according to a first state, and then a second device searches the device which has a second name according to a second state. Afterwards, whether the second name is equal or relative to the first name or not is determined. If the second name is equal or relative to the first name, the first device may communicate with the second device.

17 Claims, 4 Drawing Sheets though the ratio of the power sensed by light sensor is fixed, the relative position between the first device 11 and the second device 13 can be known according to the ratio. Therefore, the first control unit 111 may automatically change the device name to the preset name according to the sensed ratio relationship (e.g., the first sensor senses the ratio of the power is equal to 0.5, this means the ambient light is shielded half by the second device 13 or another object), and broadcast the name by the first wireless communication module 113. Similarly, the second device 13 automatically begins to search a nearby device which has a name corresponding to the second state. If the second device 13 finds the device name broadcasted by the first device 11 is equal or relative to the preset name.

DYNAMIC DEVICE NAMING AND CONNECTION IN WIRELESS COMMUNICATION SYSTEM AND METHOD THEREOF

CROSS-REFERENCE TO RELATED APPLICATIONS

The entire contents of Taiwan Patent Application No. 101113056, filed on Apr. 12, 2012, from which this application claims priority, are incorporated herein by reference.

BACKGROUND OF THE INVENTION

1. Field of the Invention

The present invention generally relates to a wireless communication device and the method thereof. More particularly, the present invention relates to a device capable of simplifying the steps of the operation and searching the neighboring communication devices in the wireless communication, and the method thereof.

2. Description of Related Art

The development of the wireless communication technology not only overcomes the limitation of the wire, but also enables the electronic device operated by the user to be wirelessly connected to another electronic device with the wireless transmission function in a certain range, such that the application of the portable device will be greatly increased.

However, considering the data security, the wireless transmission protocol usually defines a strict authentication mechanism. Therefore, the user needs to execute many steps and enter the correspondingly-password so as to communicate with the other devices. In the case of Bluetooth, before sharing the file wirelessly, the user firstly must search the names of the nearby Bluetooth devices, which is set to a default value during the manufacturing process or is reset at the initiation of the device by the user. Then, the user selects the device, which the user would like to communicate with, in the searched device name list. The file will not be shared until the devices are connected with each other successfully. Consequently, it is not only a waste of time, but the user also needs to learn the complicated searching and pairing operations, which may greatly reduce the convenience of the wireless device.

A need has thus arisen to propose a novel wireless communication method of establishing a connection between two portable devices automatically in an easy and distinctive manner.

SUMMARY OF THE INVENTION

In view of the foregoing, an embodiment of the present invention provides a wireless communication system and the method thereof, so as to enable two portable devices to be connected automatically with each other in an easy, safe and distinctive manner without the complicated human intervention.

One embodiment of the present invention is a wireless communication method, which includes following steps: firstly, a first device changes a first name of the first device according to a first state, and then a second device searches the device which has a second name according to a second state. Afterwards, whether the second name is equal or relative to the first name or not is determined by both devices themselves. If the second name is equal or relative to the first name, the first device may communicate with the second device. The first state is determined according to the application in a first device, and the second state is determined according to the application in a second device. In some cases, the first and second device may still communicate with each other, when a user represents different intentions on the first device and the second device respectively.

Another embodiment of the present invention is a wireless communication system, including a first device and a second device. The first device includes at least one first sensor, a first wireless communication module and a first control unit. The first sensor detects a first state according to a first user's intention. The first control unit, coupled between the first sensor and the first wireless communication modules, is used for automatically changing a first name of the first device according to the first state and then controlling the first wireless communication module to broadcast the first name. The second device includes at least one second sensor and a second control unit. The second sensor detects a second state according to a second user's intention. The second control unit, coupled to the second sensor, is used for searching a device which has a second name according to the second state and determining whether the second name is equal or relative to the first name. If the second name is equal or relative to the first name, the first device may communicate with the second device.

DETAILED DESCRIPTION OF THE INVENTION

Figure 1:
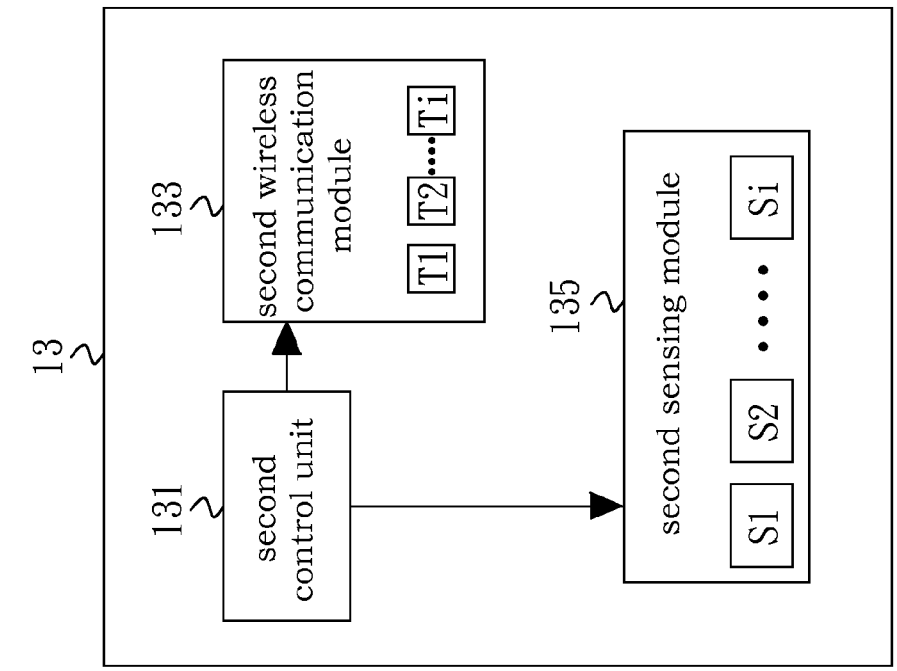
FIG. 1 is a block diagram of a wireless communication system according to an embodiment of the present invention.
Figure 1:
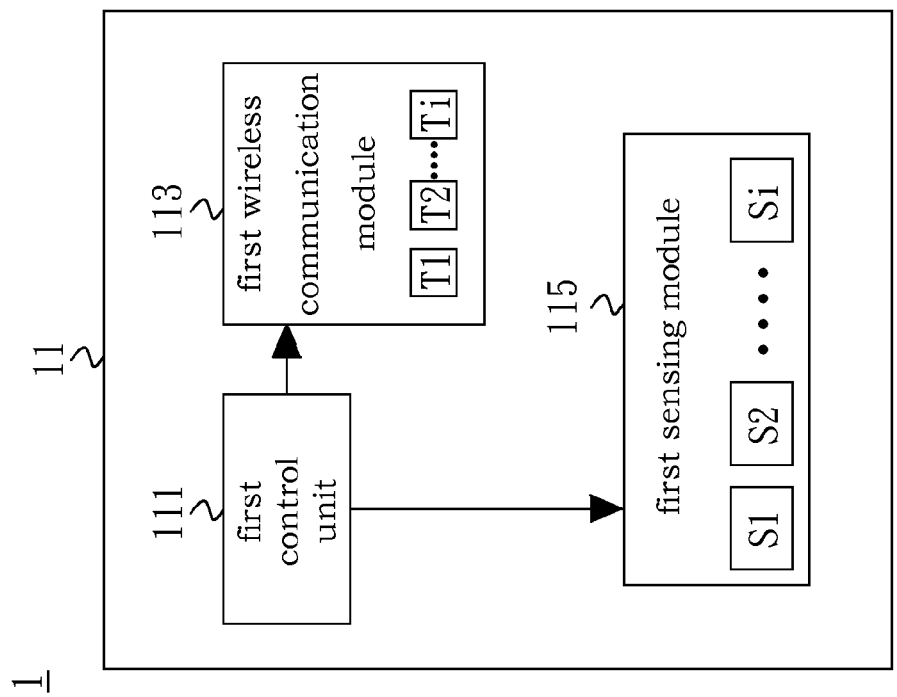

FIG. 1 shows a block diagram of a wireless communication system according to an embodiment of the present invention. The wireless communication system 1 at least includes a first device 11 and a second device 13, which may automatically certificate and connect with each other by the method proposed in the present invention and the detailed description will be in the following content. The first device 11 and the second device 13 may respectively be, but are not limited to, a desk computer, a notebook computer, a handheld PC, a personal digital assistant, a mobile phone or other handheld devices.

Referring to FIG. 1, in the present embodiment, the first device 11 mainly includes a first control unit 111, a first wireless communication module 113 and a first sensing module 115. The first sensing module 115 includes at least one sensor S1-Si (e.g., a touch sensor, an electronic compass, a three-axis accelerator, a camera, a light sensor or a combination thereof). The first control unit 111 is coupled between the first sensing module 115 and the first wireless communication module 113. Similarly, the second device 13 mainly includes a second control unit 131, a second wireless communication module 133 and a second sensing module 135. The second sensing module 135 includes at least one sensor S1-Si, and the second control unit 131 is coupled between the second sensing module 135 and the second wireless communication module 133. The wireless device may certainly include other necessary components, which those skilled in the art would easily think of. However, in order to emphasize the main technical concept of the present invention, these components will not be illustrated and described herein.

Specifically speaking, the first control unit 111 and the second control unit 131 are used respectively to control the components in corresponding devices, which may be a digital signal processor (DSP), a microcontroller, an application specific IC (ASIC), a microprocessor or other components having the same functions. The first wireless communication module 113 and the second wireless communication module 133 include respectively at least one wireless communication technology, T1-Ti, which may be Bluetooth, Wi-Fi or other communication technologies. The wireless communication module may further include a transceiver, a receiver, an antenna and other components, but not limited to what has been disclosed.

In the implementation, the user may express the intention by a gesture, a touch, a click or a voice, i.e., what is captured by the sensing module. When the first sensing module 115 of the first device 11 detects the user's intention, the name of the first device 11 will be dynamically changed. Once the other user does the corresponding action to the second device 13 in an attempt to communicate with the first device 11, such as receiving the files, the second sensing module 135 of the second device 13 may detect the user's intention, so as to search the changed name of the first device 11 by the second wireless communication module 133. Therefore, the first device 11 may be communicated with the second device 13 automatically.

Figure 2:
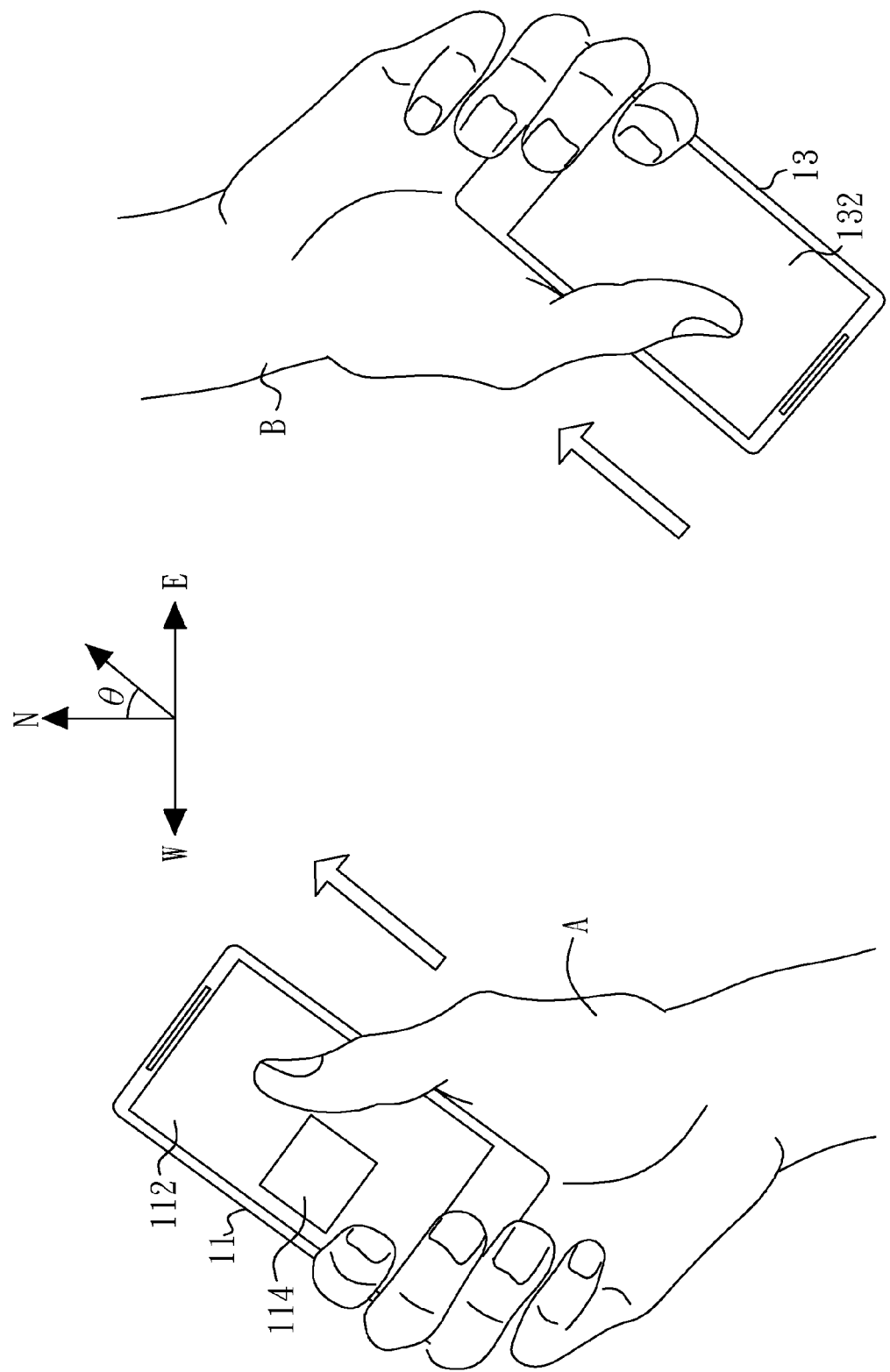
FIG. 2 is a view illustrating two devices for being connected automatically according to an embodiment of the present invention.

There are several embodiments illustrating the dynamic naming and connection mechanism of the present invention. Firstly, referring to FIG. 2, FIG. 2 is a view illustrating two devices for being connected automatically according to an embodiment of the present invention. Assuming that the user A intends to transfer a file 114 from the first device 11 to the second device 13 which is operated by the user B, the user A will click the file 114 on the touch panel 112 and make a throwing gesture with the first device held in hand, which is in the direction towards the second device 13 held by the user B.

The first sensing module 115 may sense the intention of transferring the file 114 according to the user A's action, so as to detect a first state. For example, the first state, which is detected and determined by the electronic compass and the three-axis accelerator, is a throwing signal, representing that the first device is acceleratedly moved towards the user B with an angle θ between the throwing direction and the North. Then, the first control unit 111 may change the name of the first device 11 according to the detected first state. For example, the first control unit 111 may change the name into θ. Afterwards, the first control unit 111 controls the first wireless communication module 113 to broadcast the name ⌈θ⌋, which may be received by the second wireless communication module 133 or other devices.

In a predetermined time, if the user correspondingly makes a catching gesture with the second device held in hand, which is in the direction towards the user B himself (that is, the angle between the direction of the catching gesture and the North is about θ as well), as shown in FIG. 2, the second sensing module 135 may detect a second state according to the user B's action. For example, the second state, which is detected and determined by the electronic compass and the three-axis accelerator, is a catching signal, representing that the second device is acceleratedly moved towards the user B with an angle θ between the catching direction and the North. Therefore the intention of receiving the file 114 may be sensed. The second control unit 131 may search the device whose name is θ according to the second state. When the second control unit 131 determines a result that the name of the searched device is equal (or relative) to the name of the first device 11, the two devices will be automatically connected. Then, the first control unit 111 immediately controls the first wireless communication module 113 to transfer the file 114 to the second device 13. In the present embodiment, if another user C does another catching gesture but the angle between the direction of the catching action and the North is ø, the second device 13 will not be connected with the first device 11 to receive the file 114.

Figure 3:
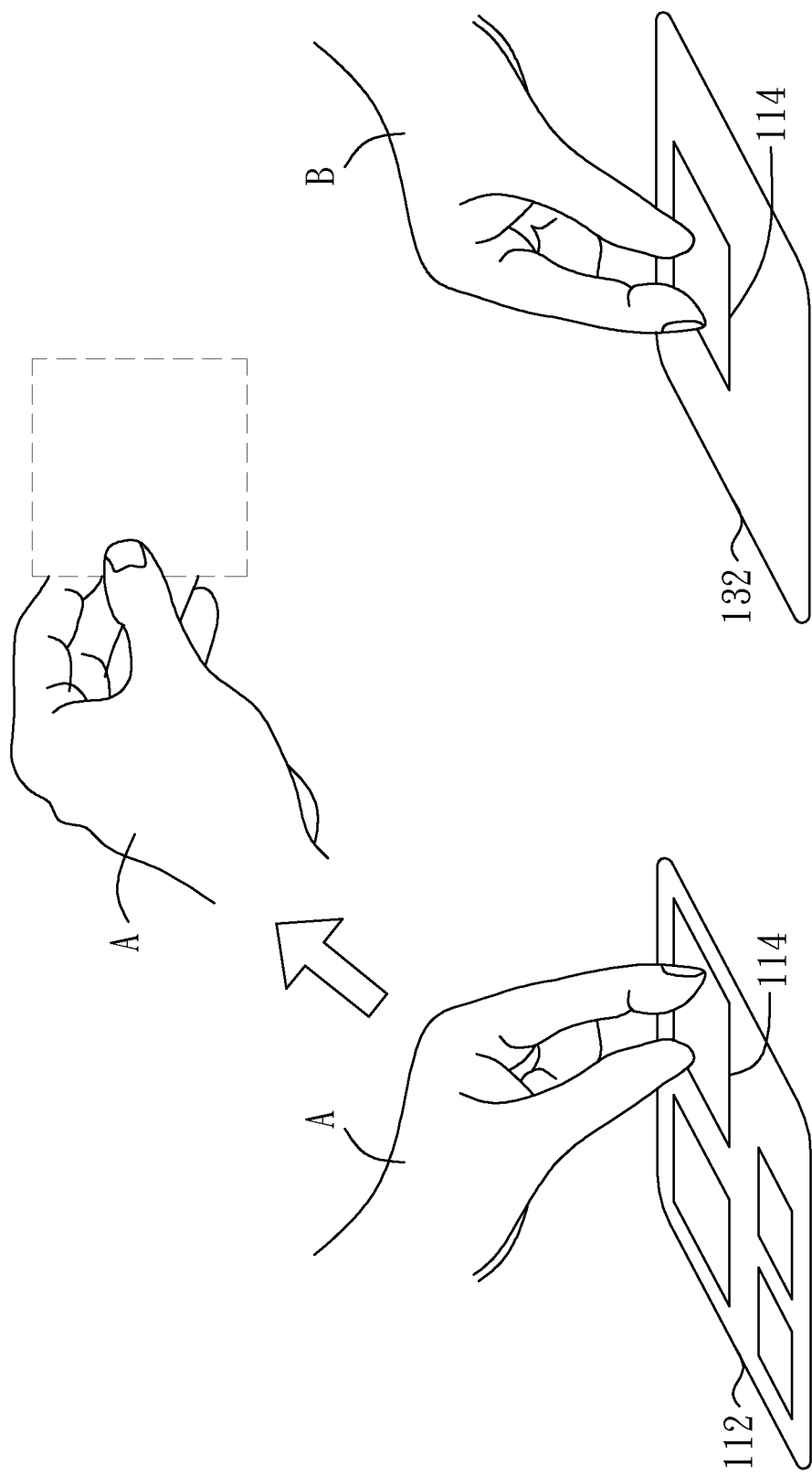
FIG. 3 is a view illustrating two devices for being connected automatically according to another embodiment of the present invention.

There are several embodiments illustrating the dynamic naming and connection mechanism of the present invention. Firstly, referring to FIG. 3, FIG. 3 is a view illustrating two devices for being connected automatically according to one embodiment of the present invention. Assuming that the user A intends to transfer the file 114 from the first device 11 to the second device 13 of his/her friend user B, the user A may do an action of ⌈pinching⌋ (such as, the fingers sliding from the outside to the inside) to the file 114 on the touch panel 112, showing the intention of transferring the file 114.

The first sensing module 115 may detect the touching state of an action of ⌈pinching⌋ due to the user A's action. The first control unit 111 may change the name of the first device 11 in to the phone number of user A stored in device 11, ⌈7343515267⌋ according to the detected touching state, and then the first control unit 111 may control the first wireless communication module 113 to broadcast the name ⌈7343515267⌋ in order to be received by the second wireless communication module 133 or other devices.

As shown in FIG. 3, when the user B, in a predetermined time, does an action of ⌈putting down⌋ (such as, the fingers sliding from the inside to the outside) on the touch panel 132 to represent the intention of receiving the file 114 to the second device 13, the second sensing module 135 may detect the touch signal (second state) according to the user B's action. The second control unit 131 may further collect the broadcast name of device 11 and other nearby devices. The second control unit 131 then compares the names with the phone numbers stored in the phone book of device 13. Since user A is user B's friend and user A's phone number 7343515267 can be found in device 13, the second control unit 131 finds that the received name ⌈7343515267⌋ matches with the one in the phone book of device 13. Therefore, the second control unit 131 controls the second wireless communications module 133 to connect to device 11. As a result, device 11 and device 13 are automatically connected. If a stranger is nearby and does the same ⌈putting down⌋ gesture during the predetermined time, his/her device cannot connect to device 11 given that the third device cannot find a matching number in its phone book.

The device name may be encrypted to further increase the security of connection.

The user's intention described in the present invention may be presented by a sound, a gesture and a wink. A sensor module includes a touch sensor, an electronic compass, a three-axis accelerator, a camera, a light sensor or a combination thereof. Therefore, the detectable states include a position, a direction, an angle, a touching action, an acceleration value, a photosensitivity or a combination thereof. Specifically, the various states and names associated with the user's intention may be defined by the software or application. For example, when the user intends to establish a connection between two devices, the two devices may be arranged side by side. Once the sensor module senses the GPS positions of the two devices are almost the same, the two devices may be automatically connected by the method mentioned above. According to the method proposed in the present invention, various pairing aspects may be implemented, including the method of changing the name of the device according to the user's intention and searching the changed name by the other device according to the user's intention.

Figure 4:
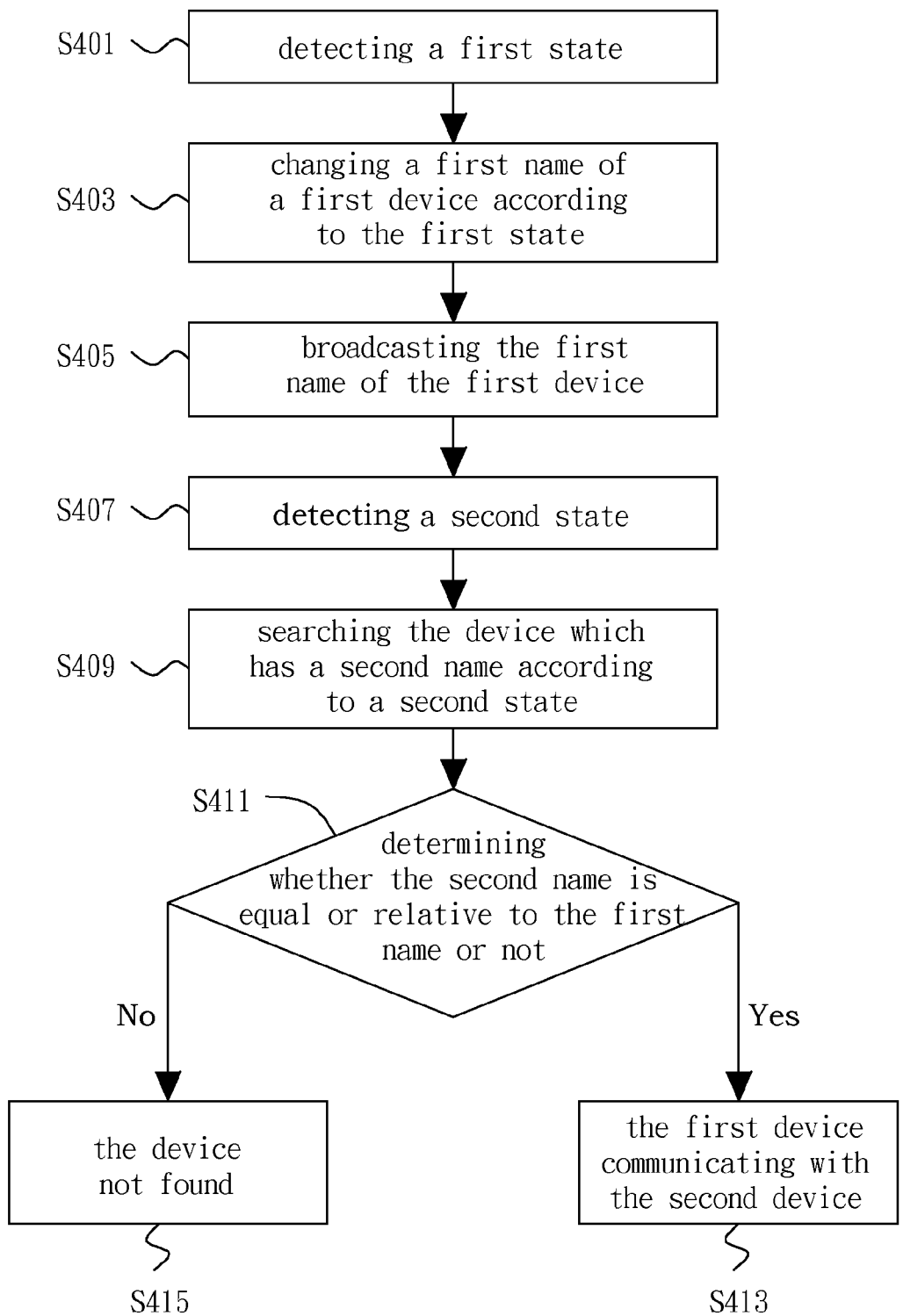
FIG. 4 is a flow diagram of a dynamic naming method according to an embodiment of the present invention.

FIG. 4 shows a flow diagram of a wireless communication method according to an embodiment of the present invention. The wireless communication method may be used in the wireless communication system 1 illustrated in FIG. 1.

Firstly, the user A does some certain actions to the first device 11 for presenting the intention. For example, the action of clicking the file 114 and dragging the file 114 in the direction towards the second device 13 may represent the intention of transmitting the file 114 to the user B (or user A) of the second device 13. Thus, the first sensing module 115 of the first device 11 may detect the first state which is related to the action (step S401).

Then, in step S403, the first control unit 111 may change the name of the first device 11 (first name) according to the detected first state, and then the first control unit 111 may control the first wireless communication module 113 to broadcast the changed name (step S405).

In a predetermined period, the user B (or the user A) also does some corresponding actions to the second device 13 to represent the intention. For example, the sliding action, whose direction is from the first device 11 towards the user of the second device 13, represents the intention of receiving the file 114 of the first device 11. Consequently, the second sensing module 135 of the second device 13 may detect the second state associated with this action (step S407).

In step S409, the second control unit 131 may search the device which has the second name according to the detected second state. As the first device 11 broadcasts the changed name, the second wireless communication module 133 may determine whether the second name is equal or relative to the first name, after the second wireless communication module 133 receives the second name (step S411).

If the second name is equal or relative to the first name, the nearby first device 11 is the searched target and therefore the pairing operation will be executed automatically, such that the first device may communicate with the second device immediately (step S413). If the second name is not equal or relative to the first name, there is no device equal or relative to the searched target device in nearby area. That is to say, there is no device available to be paired (step S415).

According to the above embodiments, the wireless communication device and method thereof proposed in the present invention may dynamically change the name in accordance with the user's intention detected by the device, and the devices may be paired by the corresponding actions done in the devices, in order to communicate with each other. By the method of the present invention, the user no longer needs to learn or understand the searching and pairing operations and the theorem thereof, and the two devices can be communicated with each other automatically by the user's instinctive actions of the intention. Consequently, the convenience of the wireless device may be increased greatly.

Although specific embodiments have been illustrated and described, it will be appreciated by those skilled in the art that various modifications may be made without departing from the scope of the present invention, which is intended to be limited solely by the appended claims.

What is claimed is:

1. A wireless communication method, comprising:
    a first device for changing a first name of the first device according to a first state;
    a second device for searching the device which has a second name according to a second state;
    determining the second name is equal or relative to the first name; and
    if the second name is equal or relative to the first name, the first device may connect with the second device;
    wherein the first state is determined according to a first user's intention, and the second state is determined according to a second user's intention, and the first user and the second user may be the same person.

2. The wireless communication method of claim 1, further comprising:
    the first device broadcasting the changed first name.

3. The wireless communication method of claim 2, further comprising:
    the second device changing the second name according to the second state;
    the first device searching the device which has the second name according to the first state; and
    the second device searching the device which has the first name according to the second state.

4. The wireless communication method of claim 3, wherein the first name is dynamically changed according to the first state.

5. The wireless communication method of claim 3, wherein the changed first name is a series of predetermined codes.

6. The wireless communication method of claim 4, wherein the first user's intention and the second user's intention are respectively represented by a sound, a gesture, a wink, a shake or clicking a camera button.

7. The wireless communication method of claim 6, wherein the first state and the second state comprise respectively a position, a direction, an angle, an acceleration value, a touching action or a combination thereof.

8. The wireless communication method of claim 7, wherein the first name and the second name comprise respectively a detected position, a detected direction, a detected angle, a software-defined string, a detected acceleration value or a combination thereof.

9. A wireless communication system, comprising:
    a first device, comprising:
        at least one first sensor, for detecting a first state according to a first user's intention;
        a first wireless communication module; and
        a first control unit, coupled between the first sensor and the first wireless communication module, for changing a first name of the first device according to the first state and controlling the first wireless communication module to broadcast the first name; and
    a second device, comprising:
        at least one second sensor, for detecting a second state according to a second user's intention;
        a second wireless communication module; and
        a second control unit, coupled to the second sensor and the second wireless communication module, for searching a device which has a second name according to the second state and determining the second name is equal or relative to the first name;
    wherein if the second name is equal or relative to the first name, the first device may communicate with the second device.

10. The wireless communication system of claim 9, wherein the second control unit changes the second name of the second device according to the second state, and controls the second wireless communication technology to broadcast the second name.

11. The wireless communication system of claim 9, wherein the first name is dynamically changed according to the first state.

12. The wireless communication system of claim 11, wherein the changed first name is a series of predetermined codes.

13. The wireless communication system of claim 12, wherein the first user's intention and the second user's intention are respectively represented by a sound, a gesture, a wink, a shake or clicking a camera button.

14. The wireless communication system of claim 13, wherein the first state and the second state comprise respectively a position, a direction, an angle, a touching action or a combination thereof.

15. The wireless communication system of claim 14, wherein the first name and the second name comprise respectively a position, a direction, an angle, a sign, an acceleration value or a combination thereof.

16. The wireless communication system of claim 9, wherein the first sensor and the second sensor comprise respectively a touch sensor, an electronic compass, a three-axis accelerator or a combination thereof.

17. The wireless communication system of claim 9, wherein the first wireless communication module and the second wireless communication module comprise respectively at least one wireless communication technology such as Bluetooth, Wi-Fi or a combination thereof.

* * * * *